United States Patent
Kessels

(10) Patent No.: US 7,831,853 B2
(45) Date of Patent: Nov. 9, 2010

(54) CIRCUIT COMPRISING MUTUALLY ASYNCHRONOUS CIRCUIT MODULES

(75) Inventor: Jozef Laurentius Wilhelmus Kessels, Eindhoven (NL)

(73) Assignee: ST-Ericsson SA, Geneva (CH)

( * ) Notice: Subject to any disclaimer, the term of this patent is extended or adjusted under 35 U.S.C. 154(b) by 333 days.

(21) Appl. No.: 10/591,546

(22) PCT Filed: Feb. 25, 2005

(86) PCT No.: PCT/IB2005/050698

§ 371 (c)(1),
(2), (4) Date: Sep. 1, 2006

(87) PCT Pub. No.: WO2005/088889

PCT Pub. Date: Sep. 22, 2005

(65) Prior Publication Data

US 2007/0273418 A1   Nov. 29, 2007

(30) Foreign Application Priority Data

Mar. 1, 2004  (EP) .................................. 04100805

(51) Int. Cl.
G06F 1/12 (2006.01)
G06F 13/42 (2006.01)
H04L 5/00 (2006.01)
H04L 7/00 (2006.01)

(52) U.S. Cl. ...................... 713/400; 713/401; 713/500; 713/501; 713/502; 713/503; 713/600

(58) Field of Classification Search ................. 713/400, 713/401, 500, 501, 502, 503, 600
See application file for complete search history.

(56) References Cited

U.S. PATENT DOCUMENTS

| 4,873,703 A | 10/1989 | Crandall et al. |
| 6,658,582 B1 * | 12/2003 | Han ........................... 713/500 |
| 7,107,474 B2 * | 9/2006 | Ogawa et al. ............... 713/401 |

(Continued)

FOREIGN PATENT DOCUMENTS

EP    1 124 179 A1    8/2001

OTHER PUBLICATIONS

International Search Report dated May 9, 2005 in connection with PCT Patent Application No. PCT/IB2005/050698.

(Continued)

*Primary Examiner*—Thomas Lee
*Assistant Examiner*—Jaweed A Abbaszadeh

(57) ABSTRACT

A circuit is described comprising a first (10) and a second circuit module (20) and a synchronization module (30). The first and the second module are mutually asynchronous, and are coupled by the synchronization module. The synchronization module (30) comprises: a transfer register (31) for storing data which is communicated between the two circuit modules, a control circuit (32) for controlling the register in response to a respective timing signal (St1, St2) from the first and the second circuit module, the control circuit comprising a control chain for generating a control signal (CR) for the transfer register (31). The control chain includes at least: a repeater (34) for inducing changes in the value of the control signal, at least one edge sensitive element (35) for delaying a change in the signal value until a transition in a selected one of the timing signals is detected.

20 Claims, 6 Drawing Sheets

U.S. PATENT DOCUMENTS

| | | | |
|---|---|---|---|
| 7,123,674 B2 * | 10/2006 | Mackey et al. | 375/354 |
| 2002/0167337 A1 | 11/2002 | Chelcea et al. | |
| 2002/0181631 A1 | 12/2002 | Mackey et al. | |
| 2003/0165158 A1 | 9/2003 | Davies et al. | |

OTHER PUBLICATIONS

Written Opinion of the International Searching Authority dated Sep. 1, 2006 in connection with PCT Patent Application No. PCT/IB2005/050698.

* cited by examiner

US 7,831,853 B2

CIRCUIT COMPRISING MUTUALLY ASYNCHRONOUS CIRCUIT MODULES

CROSS-REFERENCE TO RELATED APPLICATION(S)

The present application claims priority under 35 U.S.C. §365 to International Patent Application No. PCT/IB2005/050698 filed Feb. 25, 2005, entitled "CIRCUIT COMPRISING MUTUALLY ASYNCHRONOUS CIRCUIT MODULES". International Patent Application No. PCT/IB2005/050698 claims priority under 35 U.S.C. §365 and/or 35 U.S.C. §119(a) to European Patent Application No. 04100805.3 filed Mar. 1, 2004 and which are incorporated herein by reference into the present disclosure as if fully set forth herein.

Systems on silicon show a continuous increase in complexity due to the ever increasing need for implementing new features and improvements of existing functions. This is enabled by the increasing density with which components can be integrated on an integrated circuit. At the same time the clock speed at which circuits are operated tends to increase too. The higher clock speed in combination with the increased density of components has reduced the area which can operate synchronously within the same clock domain. This has created the need for a modular approach. According to such an approach the processing system comprises a plurality of relatively independent circuit modules operating mutually asynchronously. Internally these modules may be driven synchronously by a local clock, or may operate asynchronously.

In a particular case the asynchronous modules are peripherals which are coupled via a bus to a main module, for example via a bridge.

Communication between two mutually asynchronous circuit modules can be done via either clock bridging buffers (for data streams) or clock bridging variables.

Examples of clock bridging variables are so-called command and status registers in the interface between a processor bus and peripheral units.

It is an object of the invention to provide a circuit supporting a consistent and efficient data transfer between mutually asynchronous circuit modules. According to the invention this object is achieved by A circuit comprising a first and a second circuit module and a synchronization module, the first and the second module being mutually a-synchronous, and being coupled by the synchronization module, the synchronization module comprising
  a transfer register for storing data which is communicated between the two circuit modules,
  a control circuit for generating a control signal for the transfer register in response to a respective timing signal from the first and the second circuit module, the control circuit comprising at least
    a repeater for inducing changes in the value of the control signal,
    at least one edge sensitive element for delaying active edges in the control signal until a synchronizing transition in a selected one of the timing signals is detected, In the circuit of the invention data to be communicated is stored in the transfer register. The control circuit achieves that when the transfer register is being updated both circuit modules are not involved in either changing write data (WDAT) or using read data (RDAT).

Therefore, the data being transferred is always consistent, and with a small delay and few minor interruptions always available to the module reading the data. The control chain may be extended with portions of the first and the second circuit module.

These and other aspects are described in more detail with reference to the drawing. Therein FIG. 1 schematically shows a circuit according to the invention.

In these Figures elements having reference numbers which differ by 100 or a multiple thereof have the same or a similar function.

Figure 1:
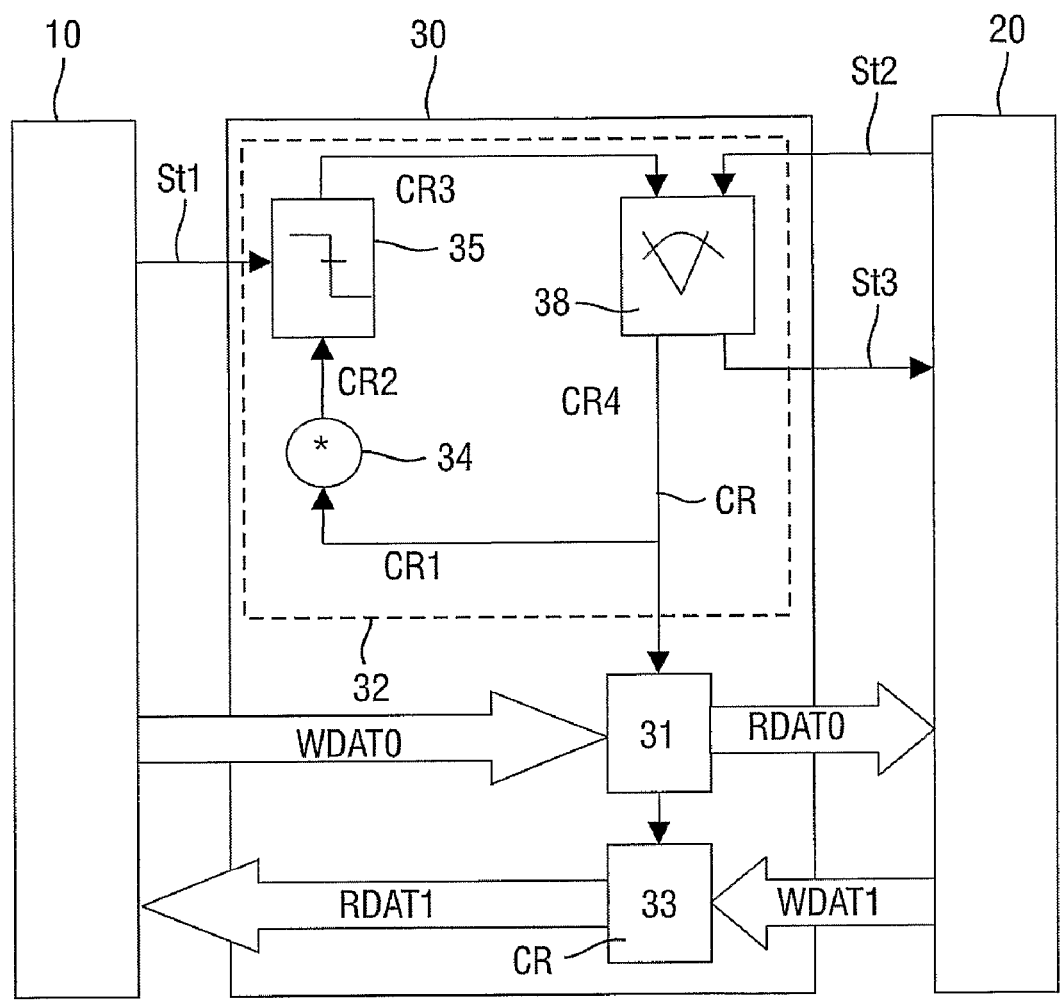

FIG. 1 schematically shows a circuit according to the invention. It comprises a first circuit module 10, a second circuit module 20, which are mutually asynchronous, and a synchronization module 30.

The synchronization module 30 comprises a transfer register 31 for temporarily storing data which is transferred from the first 10 to the second circuit module 20 and a transfer register 33 for storing data that is communicated in the opposite direction. The transfer registers 31 and 33 are controlled by a control circuit 32 which operates in response to respective timing signal St1, St2 from the first and the second circuit module 10,20. Timing signal St1 may have a regular nature, such as a clock signal or may be irregular, the synchronization transitions in that signal indicate that its write data (WDAT0) will be stable for a longer period after a short delay and that its ingoing read data signal (RDAT1) will not be used for a longer period. In this case the first circuit module 10 is a clocked module with clock signal St1 and the second module 20 is an asynchronous module with handshake signals St2 and St3. St2 is used by circuit module 20 to request access to the transfer registers and St3 is an acknowledge signal by which the synchronization module 30 indicates the right to access the registers. The control circuit 32 comprises a control chain for generating a control signal CR that controls the registers 31 and 33. The control circuit 32 includes a repeater 34 for inducing transitions in the value of the control signal CR, and at least one edge sensitive element 35 for delaying an active transition in the control signal value until a synchronization transition in a selected one of the timing signals (here the signal St1) is detected. In addition the control chain comprises an arbitration element 38. The first and the second circuit module may be integrated on a chip, or may be part of different chips. The circuit may include one or more further circuit modules.

The circuit shown in FIG. 1 operates as follows. The control chain generates signal CR which is used to control the transfer registers in 3 stages. The repeater 34 amends the value of control signal CR1, for example by inversion, to obtain the second stage CR2. An active transition in signal CR2 is delayed until a synchronization transition is detected in timing signal St1 by the edge sensitive element 35. The synchronized control signal CR3 is one of the inputs of an arbiter (38), which has request signal St2 as the other input. The arbiter blocks active transitions in CR3 when circuit module 20 has the right to access the transfer registers. When circuit module 20 is not using the transfer registers, the active transitions in signal CR3 are passed on to signal CR4.

This event enables the transfer registers to store their input values: WDAT0 in register 31 and WDAT1 in register 33. By means of timing signal St2 the second circuit module 20 indicates that it wants to communicate: read RDAT0 or change WDAT1 (or both). Timing signal St3 indicates to module 20 that it has the right to read RDAT0 and change WDAT1. The arbitrator 38 then blocks active transitions in signal CR, so that the transfer registers do not change their value until circuit module 20 indicates via signal St2 that it has completed the communication For the control signals one can use two- or four-phase signaling. In a two-phase signaling scheme all transitions are active. In a four-phase signaling scheme either the rising or the falling edges are active. The preferred embodiment of the invention is four-phase handshake signaling with the rising edges as active transitions. In that case the edge sensitive element 35 has to delay both transitions until it is triggered by the timing signal St1. Practical implementations for the elements used in the present invention such as wait elements, edge sensitive elements, arbiters, sequencers and repeaters are well known to the person skilled in the art of asynchronous signal processing, and will therefore not be described in detail here.

Figure 2:
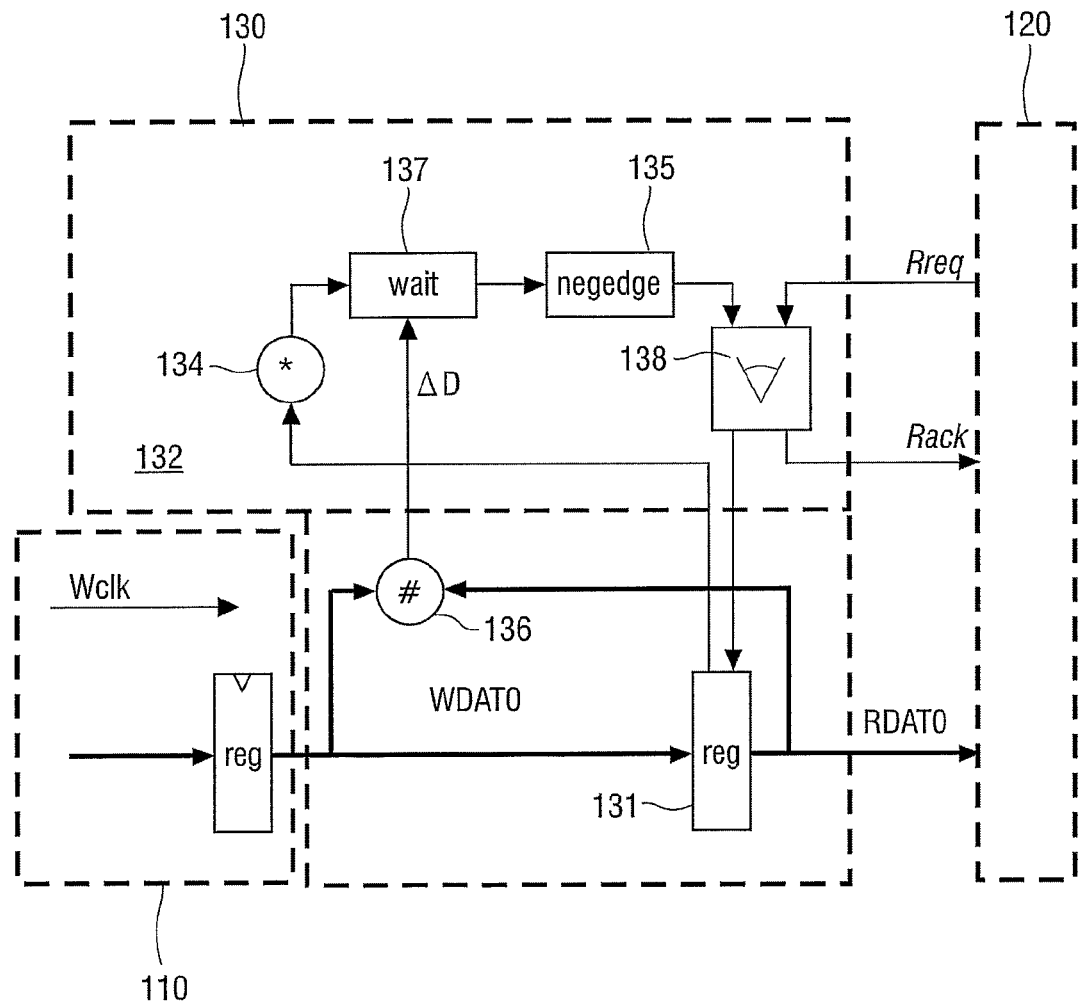
FIG. 2 shows in more detail an embodiment of the synchronization module.

FIG. 2 shows in more detail an embodiment of the synchronization module 30. Parts therein corresponding to those of FIG. 1 have a reference number, which is 100 higher. The module shown therein further comprises a comparator 136 for generating a difference signal $\Delta D$ upon detection of a difference between an input and an output of the transfer register 131. The control chain further comprises a wait element 137 for delaying an active transition in the control signal CR until a difference is detected between the input and the output of the transfer register. The circuit shown in FIG. 2 comprises a first circuit module 110 which provides a clock signal Wclk as the selected timing signal. The timing signal from the second circuit module 120 is a read request signal Rreq. The arbiter 138 has its first channel being arranged between an output of the edge sensitive element 135 and an input of the repeater 134. Its second channel has a first input for receiving the read request signal Rreq and a second output for providing a read acknowledge signal Rack to the second circuit module.

The operation of the circuit shown in FIG. 2 differs from the circuit shown in FIG. 1 in the following respect. If no new data is offered to the transfer register 131, i.e. if the data offered at the input of transfer register 131 is equal to the data stored therein, the control signal $\Delta D$ is false, and consequently the wait element 137 blocks the active transitions in the control signal. As the wait element 137 forms a closed chain with the elements 134, 135 and 138 all activity in the chain is suspended until new data is offered to the transfer register 131. This measure may reduce the power consumption of the circuit.

Figure 2A:
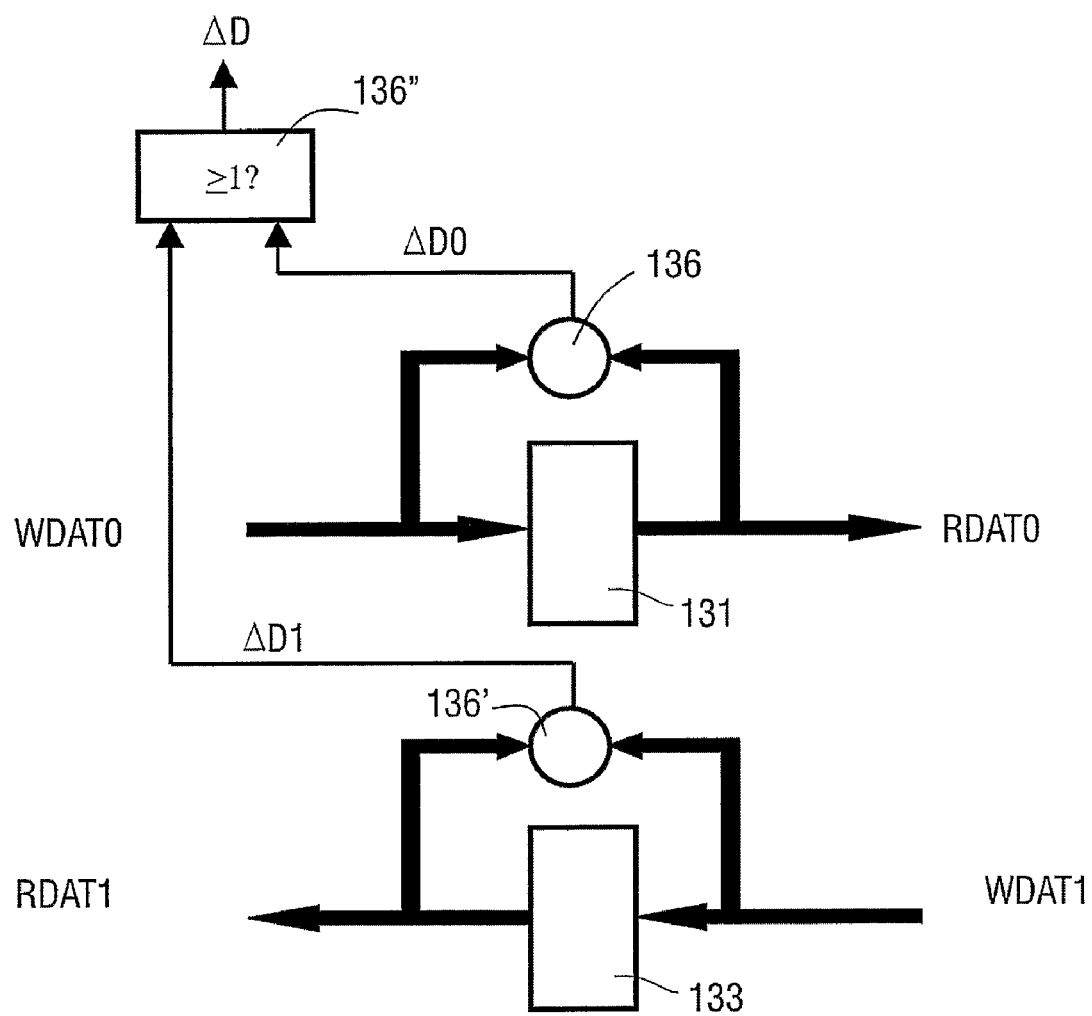
FIG. 2A shows a detail in a particular embodiment of this embodiment.

Alternatively the synchronization module 130 may have a register 133 for temporarily storing data WDAT1 from the second circuit module 120 to provide this as data RDAT1 to the first circuit module 110 instead of the register 131. Additionally the synchronization module 130 may have a comparator 136' for comparing the data WDAT1 and RDAT1 to control the wait element 137. Alternatively the synchronization circuit may both comprise a register 131 for temporarily storing WDAT0 and a register 133 for storing WDAT1 as is shown in FIG. 2A. Likewise the synchronization module may have a comparator 136' for comparing WDAT1 with RDAT1 in addition to the comparator 136 for comparing WDAT0 with RDAT0. A logical gate 136'' may combine the signal $\Delta D0$ with a corresponding signal $\Delta D1$ that indicates whether there is a difference between the signals WDAT1 and RDAT1. In response the logical gate 136'' provides a signal $\Delta D$ which indicates whether at least one of the signals $\Delta D0$ or $\Delta D1$ indicates a difference, so as to enable the wait element 137 to pass on an active transition in the control signal provided by the repeater 34.

Figure 3:
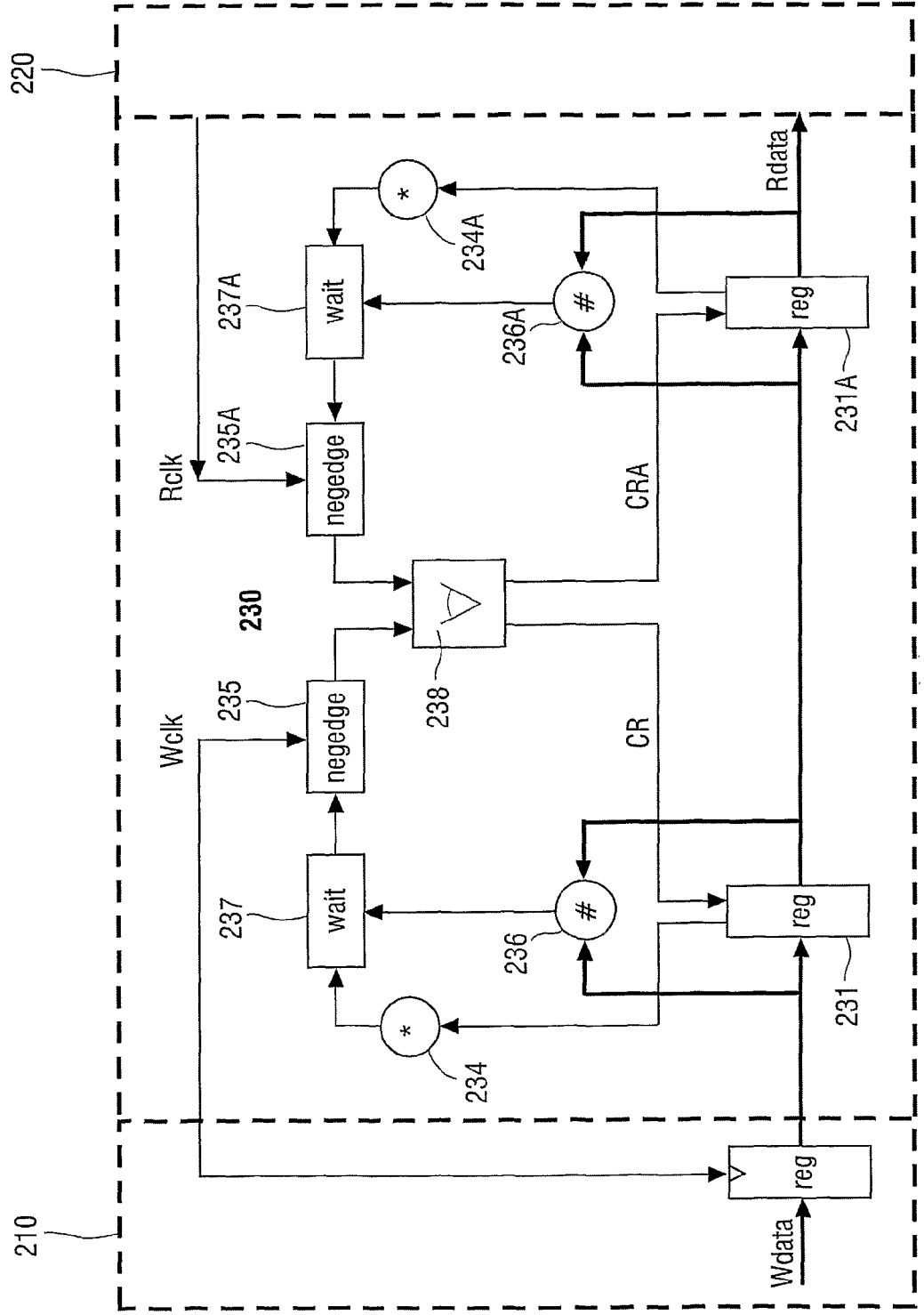
FIG. 3 shows a further embodiment of the synchronization module.

A further embodiment is shown in FIG. 3. Parts therein corresponding to those of FIG. 1 have reference number that is 200 higher. In the embodiment of FIG. 3 both the first 210 and the second circuit module 220 operate synchronously, but they have independent clocks (Wclk, Rclk resp.). The selected one of the timing signals which controls the edge sensitive element 235 is the clock signal Wclk from the first circuit module 210. The circuit includes an additional register 231A for transferring data from the transfer register 231 to the second circuit module 220. The control circuit comprises a comparable control chain for generating a control signal CRA for the auxiliary transfer register 231A. In particular the circuit includes a further edge sensitive element 235A for delaying an active transition in a control signal CRA for the auxiliary register 231A until a synchronizing transition is detected in a timing signal Rclk from the second circuit module 220. The control chains for the transfer register 231 and the auxiliary transfer register 231A are mutually coupled via the shared arbitration element 238. The arbitration element 238 prevents that the transfer register 231 and the auxiliary transfer register 231A are updated at the same time.

Figure 4:
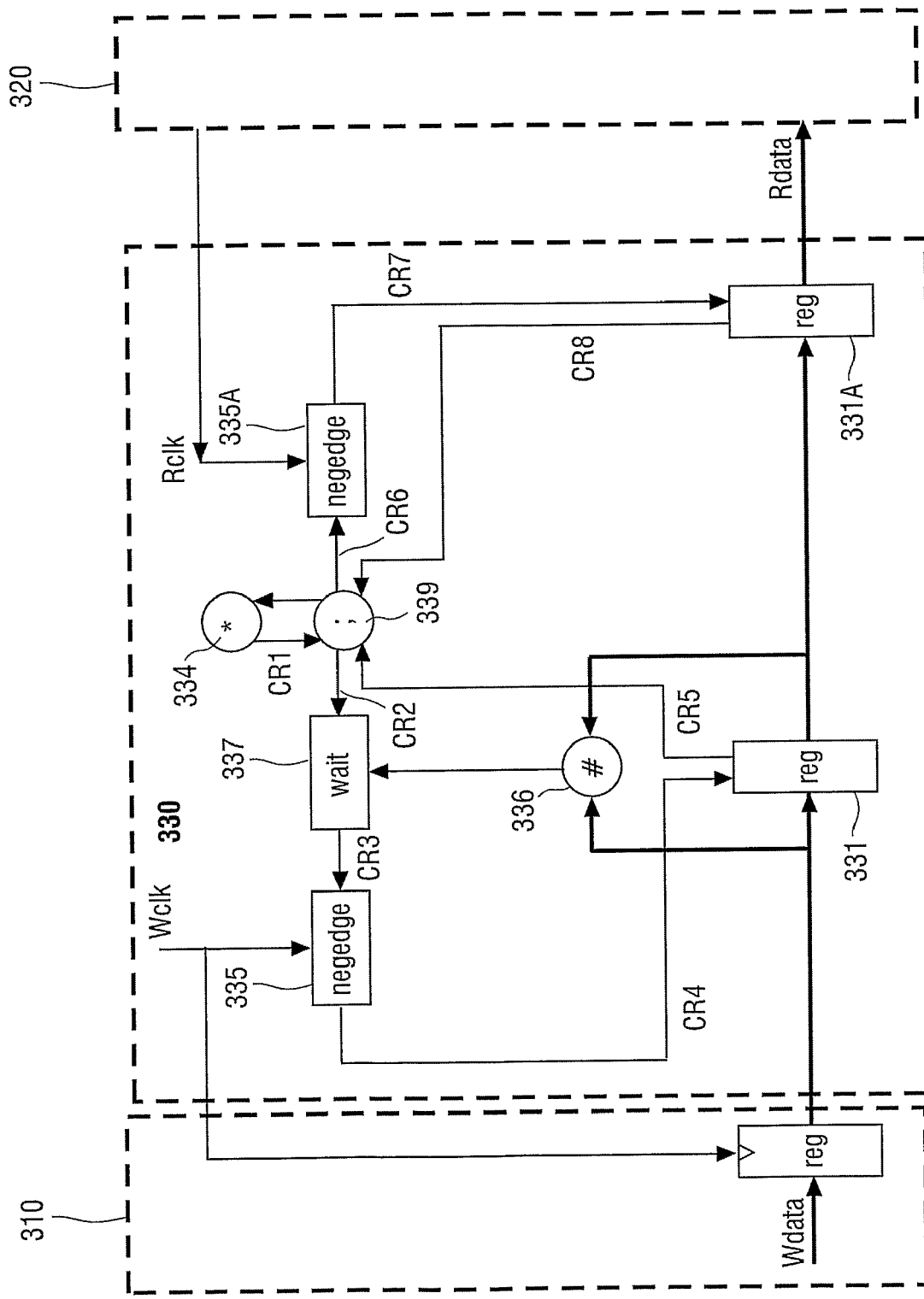
FIG. 4 shows again a further embodiment of the synchronization module.

FIG. 4 shows a simplified embodiment having the same functionality as the embodiment of FIG. 3. Elements comparable to those of FIG. 3 have a reference number which is 100 higher.

As in the embodiment of FIG. 3 the synchronization module 330 comprises an auxiliary transfer register 331A. Here the control chain for both transfer register 331 and auxiliary transfer register 331A are mutually coupled via a sequencer 339, so as to form a single chain. In this embodiment the further edge sensitive element 335A is part of the control chain.

In the embodiment the control signal CR for the transfer registers 331 and 331A repetitively undergoes the following stages. The first stage CR1 of the control signal is generation of active events by the repeater 334. The repeater sends an event to the sequencer 339, which will then send this event to wait element 337 via signal CR2. In the next stage CR2 the active events are passed to the wait element 337 to be forwarded as stage 3 signal CR3 to the edge sensitive element 335 as soon as a difference is detected between input and output of the transfer register 331. The edge sensitive element 335 transfers the active transitions in the stage 3 signal to the stage 4 signal CR4 if a synchronizing edge is detected in the clock signal Wclk. The stage 4 signal on its turn causes the transfer register 331 to accept the new data offered by the first module 310. The transfer register 331 acknowledges this by a stage 5 signal CR5, which usually will be an unconditionally delayed version of the stage 4 signal CR4. The sequencer 339 passes this signal as stage 6 signal CR6 to the auxiliary edge sensitive element 335A which transmits this as stage 7 signal CR7 upon detection of a synchronization transition in the clock signal Rclk. The signal CR7 causes the auxiliary transfer register 331A to accept new data from the transfer register 331. It provides signal CR8 to indicate completion to the sequencer 339, which passes this signal to the repeater 334. The repeater 334 on its turn then generates in a next round the stage 1 of the control signal CR1. In this embodiment sequencer 339 prevents that the transfer register 231 and the auxiliary transfer register 231A are updated at the same time.

FIG. 5 shows again another embodiment. It comprises an auxiliary register 431B for transferring data from the first module 410 to the register 431. The selected timing signal is a clock signal Rclk from the second circuit module 420. The timing signal from the first circuit module 410 is a write request signal Wreq.

The signal chain comprises the first channel of the arbitration element 438, between a first input a coupled to the edge sensitive element 435 and a first output b coupled to a control input of the register 431. The register 431 has a control output coupled to repeater 434. The control input and the control output of register 431 are usually directly connected or may alternatively be coupled via a delay function. The repeater 434 is coupled via wait element 437 to a first input a of the edge sensitive element 435. The second channel of the arbitration element 438 has a second input c for receiving the write request signal Wreq and a second output d for providing a control signal to control the auxiliary register 431B. The auxiliary register 431B may optionally include a delay element to provide a write acknowledge signal Wack to the first circuit module 410 in response to the control signal Wreq. Alternatively the write acknowledge signal Wack may be provided without delay to the first circuit module 410.

Figure 5:
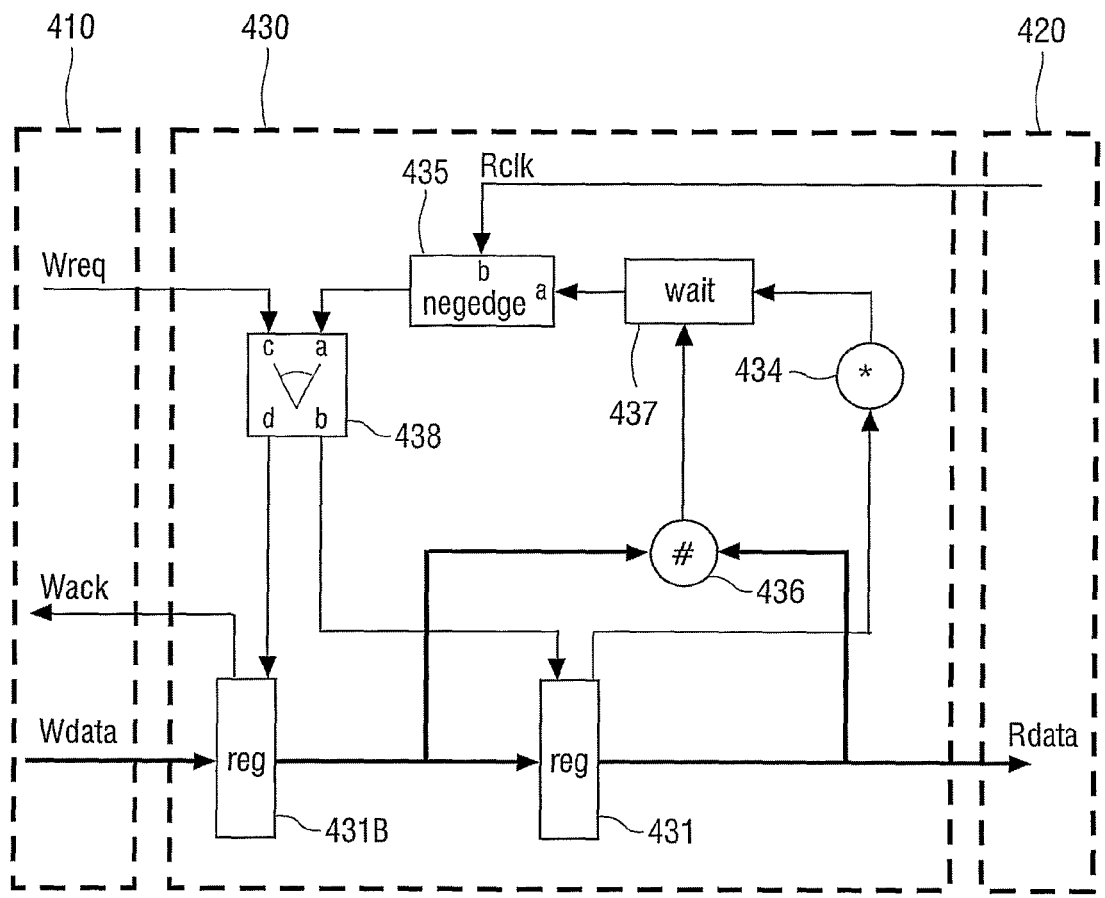
FIG. 5 shows a still further embodiment of the synchronization module.

The embodiments of FIGS. 3, 4 and 5 can also be implemented without wait elements at the cost of additional power consumption.

Several circuits can be found in "Handshake Circuits: an Asynchronous Architecture for {VLSI} Programming" by "Kees van Berkel, series="International Series on Parallel Computation", volume 5, "Cambridge University Press", 1993, pp. 162-163. The article "Bridging Clock Domains by Synchronizing the Mice in the Mousetrap" by Joep Kessels and Ad Peeters and Suk-Jin Kim, editor: Jorge Juan Chico and Enrico Macii, Patmos Incs, volume 2799, pp. "141-150", September, 2003 describes several examples of synchronizing circuits. Also modules for conversion between two-phase and four-phase handshake signaling are well known to persons skilled in the art of asynchronous circuit design. The active clock edge, the passive clock edge or both can function as synchronization events in signal St1 depending on the data valid requirements.

It is remarked that the scope of protection of the invention is not restricted to the embodiments described herein. Neither is the scope of protection of the invention restricted by the reference numerals in the claims. The word 'comprising' does not exclude other parts than those mentioned in a claim. The word 'a(n)' preceding an element does not exclude a plurality of those elements. Means forming part of the invention may both be implemented in the form of dedicated hardware or in the form of a programmed general purpose processor. The invention resides in each new feature or combination of features.

The invention claimed is:

1. A circuit comprising a first and a second circuit module and a synchronization module, the first and the second module being mutually asynchronous, and the first and the second module being coupled by the synchronization module, the synchronization module comprising:
   a transfer register for storing data which is communicated between the two circuit modules,
   a control circuit for controlling the register in response to a respective timing signal from the first and the second circuit module, the control circuit comprising a control chain for generating a control signal for the transfer register the control chain including at least:
      a repeater for inducing changes in the value of the control signal wherein the repeater is operable with a single input, and
      one edge sensitive element for delaying a change in the value of the control signal until a transition in a selected one of the timing signals is detected.

2. A circuit according to claim 1, further comprising a comparator for generating a difference signal upon detection of a difference between an input and an output of the transfer register the control chain further comprising a wait element for delaying an active transition in the control signal until a difference is detected.

3. A circuit according to claim 1 wherein the control chain further comprises an arbitration element the arbitration element having respective channels for guiding at least a first and a second signal flow, the arbitration element being arranged for arbitrating between passing active events in the first and the second signal flow, the first channel being arranged between an output of the edge sensitive element and an input of the repeater.

4. A circuit according to claim 3, wherein the selected timing signal is a clock signal from the first circuit module wherein the timing signal from the second circuit module is an access request signal, the second channel of the arbitration element having a first input for receiving the access request signal and a first output for providing an access acknowledge signal to the second circuit module.

5. A circuit according to claim 3, further comprising an auxiliary register for transferring data from the first module to the register wherein the selected timing signal is a clock signal from the second circuit module wherein the timing signal from the first circuit module is a write request signal, the second channel of the arbitration element having a second input for receiving the write request signal and a second output for providing a control signal to control the auxiliary register.

6. A circuit according to claim 1 wherein the selected one of the timing signals is a clock signal from the first circuit module the circuit including an auxiliary register for transferring data from the transfer register to the second circuit module and wherein the circuit includes a further edge sensitive element for delaying a change in a control signal for the auxiliary register until a transition is detected in a timing signal from the second circuit module.

7. A circuit according to claim 6, wherein the further edge sensitive element is part of the control chain.

8. A circuit according to claim 6, wherein the further edge sensitive element is part of a further control chain, which is coupled to the control chain.

9. A circuit according to claim 1, wherein the synchronization module has a first transfer register for transferring data from the first to the second circuit module and a second transfer register for transferring data from the second to the first circuit module the transfer registers being controlled by the same control signal.

10. A method for transferring data between a first and a second circuit module using a synchronization module the first and the second module being mutually asynchronous, and the first and the second module being coupled by the synchronization module, the method comprising:
   temporarily storing data which is transferred from the first to the second circuit module in a register,
   controlling the register in response to a respective timing signal from the first, and the second circuit module, by a control circuit which comprises a control chain for generating a control signal wherein:
   changes are induced in the value of the control signal,
   a change in the control signal value is delayed until a transition in a selected one of the timing signals is detected and wherein the changes are operable to be induced through a single input.

11. A method according to claim 10, wherein the changes are introduced through a repeater.

12. A method according to claim 10, further comprising a edge sensitive element to delaying the change in the control signal value.

13. A method according to claim 12 wherein the selected one of the timing signals is a clock signal from the first module the circuit including an auxiliary register for transferring data from the transfer register to the second circuit module.

14. A method according to claim 13, wherein the circuit includes a further edge sensitive element for delaying a change in a control signal for the auxiliary register until a transition is detected in a timing signal from the second circuit module.

15. A method according to claim 14, wherein the further edge sensitive element is part of the control chain.

16. A method according to claim 14, wherein the further edge sensitive element is part of a further control chain, which is coupled to the control chain.

17. A method according to claim 13, wherein the control chain further comprises an arbitration element the arbitration element having respective channels for guiding at least a first and a second signal flow, the arbitration element being arranged for arbitrating between passing active events in the first and the second signal flow, the first channel being arranged between an output of the edge sensitive element and an input of the repeater.

18. A synchronization module, comprising:
a first and a second circuit module and a synchronization module, the first and the second circuit module being mutually asynchronous, and the first and the second circuit module being coupled by the synchronization module,
a transfer register for storing data which is communicated between the two circuit modules,
a control circuit for controlling the register in response to a respective timing signal from the first and the second circuit module, the control circuit comprising a control chain for generating a control signal for the transfer register, wherein the control chain comprises a single input that is fed into a repeater for inducing changes in the value of the control signal; and one edge sensitive element for delaying a change in the signal value until a transition in a selected one of the timing signals is detected.

19. A module according to claim 18, further comprising a comparator for generating a difference signal upon detection of a difference between an input and an output of the transfer register the control chain further comprising a wait element for delaying an active transition in the control signal until a difference is detected.

20. A module according to claim 18, wherein the control chain further comprises an arbitration element the arbitration element having respective channels for guiding at least a first and a second signal flow, the arbitration element being arranged for arbitrating between passing active events in the first and the second signal flow, the first channel being arranged between an output of the edge sensitive element and an input of the repeater.

* * * * *